(12) United States Patent
Lnu et al.

(10) Patent No.: US 10,119,494 B2
(45) Date of Patent: Nov. 6, 2018

(54) MULTI-LAYER GASKET ASSEMBLY

(71) Applicant: Federal-Mogul Corporation, Southfield, MI (US)

(72) Inventors: Harish Lnu, Troy, MI (US); Jake Hu, Canton, MI (US); Takashi Okano, Commerce Township, MI (US)

(73) Assignee: Tenneco Inc., Lake Forest, IL (US)

( * ) Notice: Subject to any disclaimer, the term of this patent is extended or adjusted under 35 U.S.C. 154(b) by 28 days.

(21) Appl. No.: 14/811,150

(22) Filed: Jul. 28, 2015

(65) Prior Publication Data

US 2017/0030293 A1 Feb. 2, 2017

(51) Int. Cl.
| | |
|---|---|
| *F02F 11/00* | (2006.01) |
| *B23K 26/32* | (2014.01) |
| *F16J 15/08* | (2006.01) |
| *B23K 103/04* | (2006.01) |

(52) U.S. Cl.
CPC ............ *F02F 11/002* (2013.01); *B23K 26/32* (2013.01); *F16J 15/0825* (2013.01); *F16J 15/0893* (2013.01); *B23K 2203/05* (2015.10); *F16J 2015/0868* (2013.01)

(58) Field of Classification Search
CPC ......... F02F 11/002; F02F 11/00; B23K 26/32; B23K 2203/05; F16J 15/0825; F16J 15/0893; F16J 2015/0868; F16J 15/0818
USPC .................................................. 277/590–598
See application file for complete search history.

(56) References Cited

U.S. PATENT DOCUMENTS

| | | | |
|---|---|---|---|
| 4,896,891 A | | 1/1990 | Udagawa |
| 5,286,039 A | * | 2/1994 | Kawaguchi .......... F16J 15/0825 |
| | | | 277/593 |
| 5,332,237 A | | 7/1994 | Hagiwara et al. |
| 5,385,354 A | | 1/1995 | Hagiwara et al. |
| 5,393,076 A | | 2/1995 | Hagiwara et al. |
| 5,431,418 A | * | 7/1995 | Hagiwara ............ F16J 15/0825 |
| | | | 277/592 |
| 5,472,217 A | | 12/1995 | Hagiwara et al. |
| 5,568,932 A | | 10/1996 | Tanaka et al. |
| 5,601,292 A | | 2/1997 | Tanaka et al. |

(Continued)

FOREIGN PATENT DOCUMENTS

| | | |
|---|---|---|
| EP | 0531076 A1 | 3/1993 |
| EP | 0892199 A2 | 1/1999 |

(Continued)

OTHER PUBLICATIONS

International Search Report, dated Oct. 7, 2016 (PCT/US2016/044348).

*Primary Examiner* — Nathan Cumar
(74) *Attorney, Agent, or Firm* — Robert L. Stearns; Dickinson Wright, PLLC

(57) ABSTRACT

The multi-layer gasket assembly includes a plurality of metal gasket layers which have at least one set of axially aligned openings. The plurality of gasket layers includes at least two functional layers which are arranged in a stacked relationship with one another. Each functional layer has at least one full embossment bead that is spaced radially from and surrounds the at least one opening. The functional layers are also arranged such that the full embossment beads are in a nested relationship with one another. At least one stopper is positioned adjacent the nested full embossment beads for preventing full flattening of the full embossment beads.

8 Claims, 6 Drawing Sheets

(56) References Cited

U.S. PATENT DOCUMENTS

| | | |
|---|---|---|
| 5,639,101 A | 6/1997 | Tanaka et al. |
| 5,664,790 A | 9/1997 | Tanaka et al. |
| 5,690,342 A | 11/1997 | Tanaka et al. |
| 6,053,503 A * | 4/2000 | Buck .................. F16J 15/0825 277/592 |
| 6,565,098 B2 | 5/2003 | Bleyh |
| 6,688,606 B2 | 2/2004 | Hohe et al. |
| 6,708,982 B2 | 3/2004 | Zerfass et al. |
| 7,086,651 B2 | 8/2006 | Zerfass et al. |
| 7,997,585 B2 | 8/2011 | Werz et al. |
| 8,646,783 B2 | 2/2014 | Fritz |
| 2003/0155719 A1* | 8/2003 | Obermaier ............ F02F 11/002 277/591 |
| 2003/0168818 A1 | 9/2003 | Pepin |
| 2005/0110222 A1* | 5/2005 | Matsumoto ........... F02F 11/002 277/592 |
| 2005/0134005 A1* | 6/2005 | Udagawa ............. F16J 15/0825 277/594 |
| 2011/0042904 A1* | 2/2011 | Clemons ............. F16J 15/0825 277/594 |
| 2011/0127729 A1 | 6/2011 | Takeda et al. |
| 2014/0361495 A1 | 12/2014 | Swasey et al. |
| 2015/0069719 A1 | 3/2015 | Hu et al. |

FOREIGN PATENT DOCUMENTS

| | | |
|---|---|---|
| WO | 2011022530 A2 | 2/2011 |
| WO | 2014200995 A1 | 2/2014 |

* cited by examiner

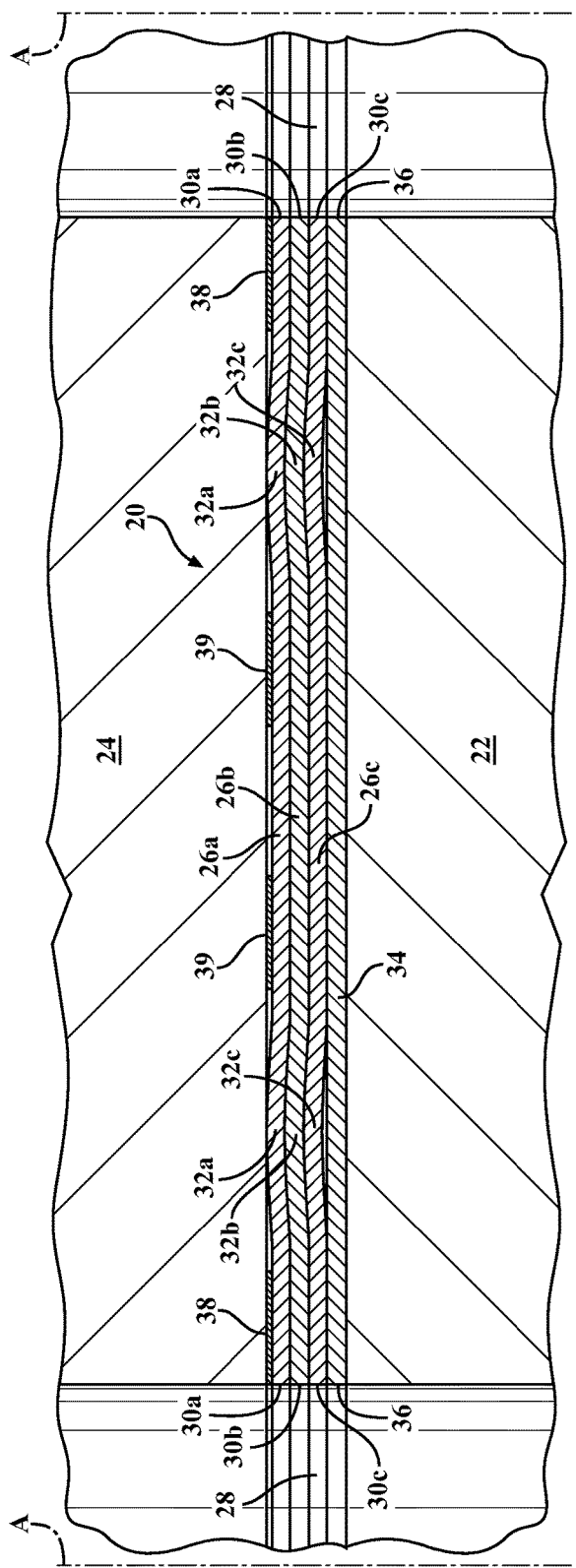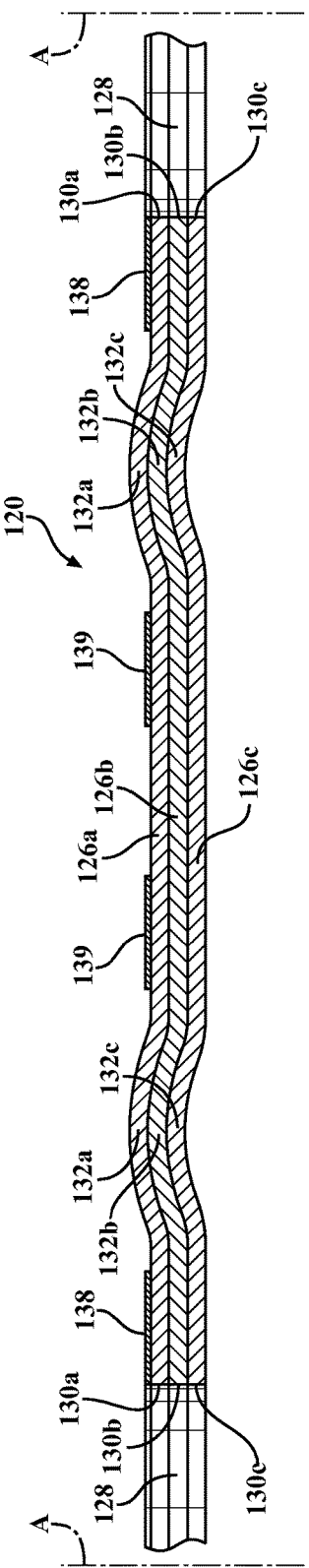
FIG. 3
FIG. 4

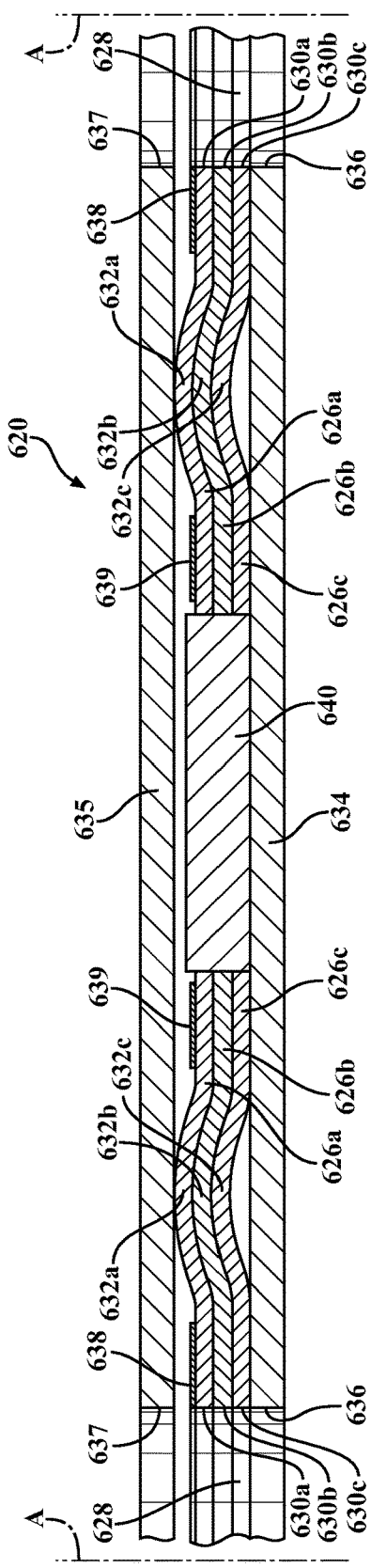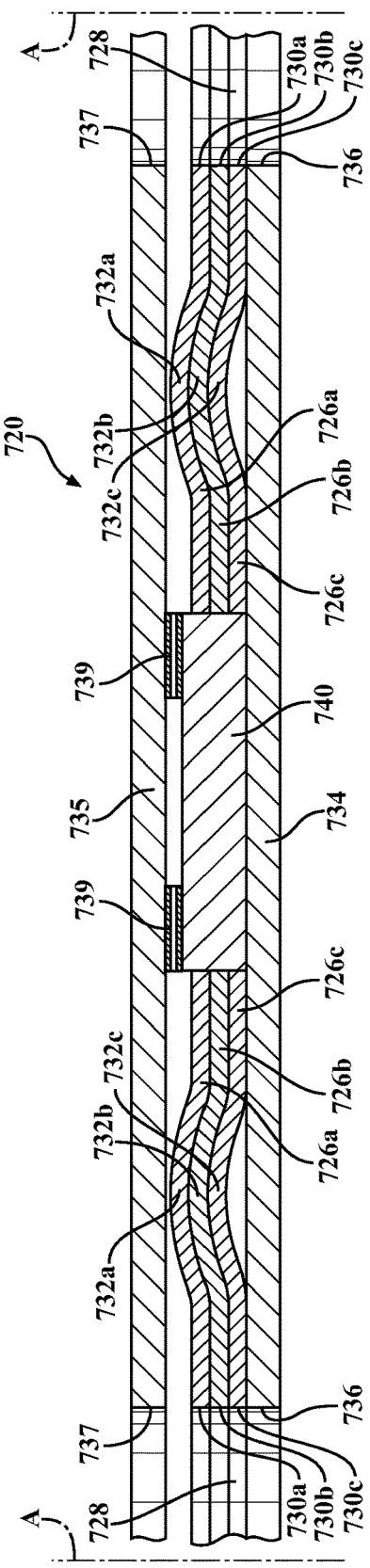
FIG. 9
FIG. 10

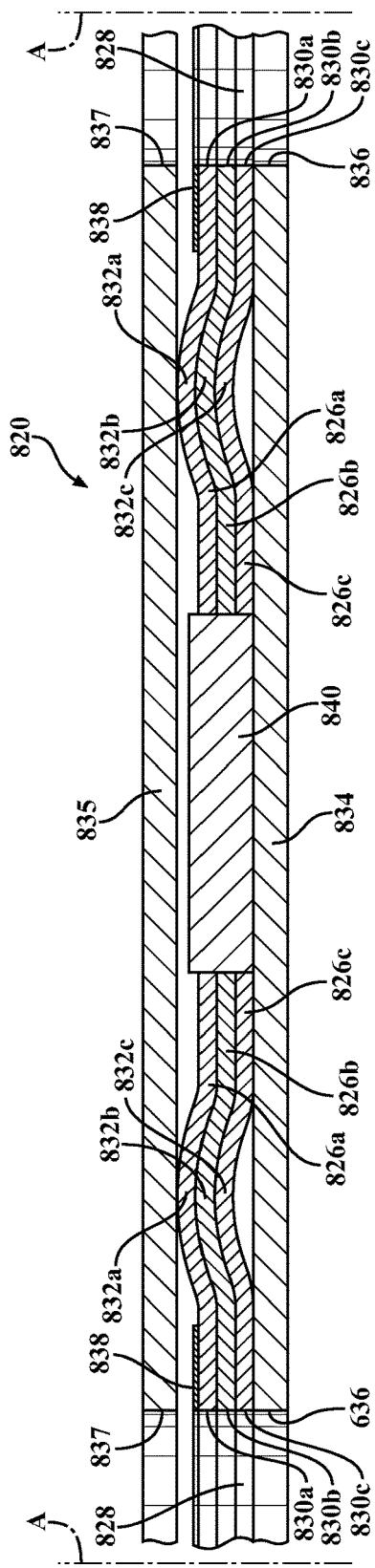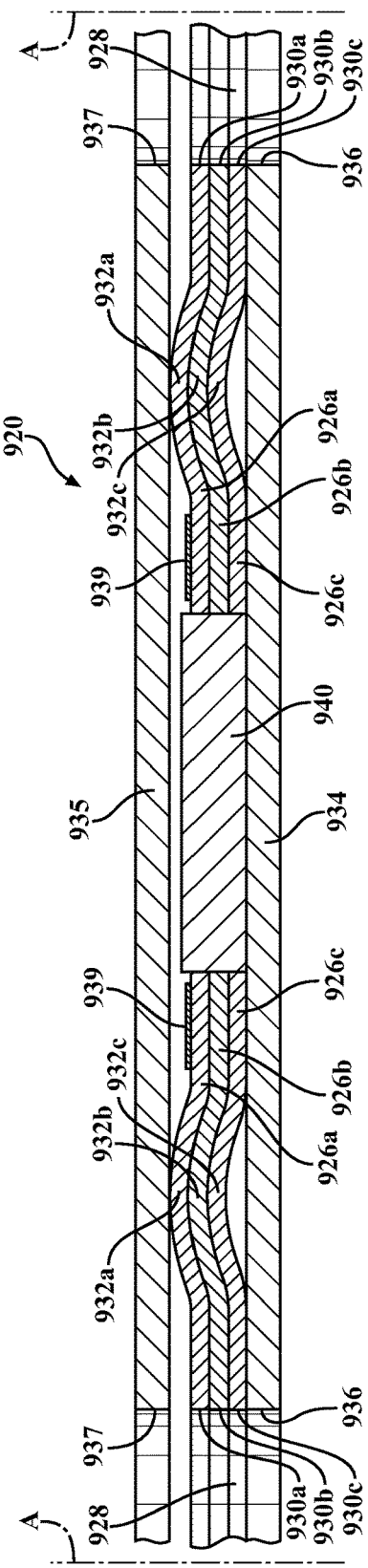
FIG. 11
FIG. 12

MULTI-LAYER GASKET ASSEMBLY

BACKGROUND OF THE INVENTION

1. Field of the Invention

The subject invention relates to multi-layered gasket assemblies for internal combustion engines and to methods of manufacturing such multi-layered gasket assemblies.

2. Related Art

Multi-layered gaskets are often used to form a seal between two mating surfaces of a mechanical system or device, such as an internal combustion engine, to prevent leakage of combustion gasses, cooling water, lubricating oil, and the like. One common application involves placing the multi-layered gasket between an engine block and a cylinder head of the internal combustion engine. Such cylinder head gaskets typically extend around a plurality of cylinder bores in an engine block to seal high-pressure combustion gasses within the cylinder bores as well as to seal oil and coolant passages. Once installed, the multi-layered steel gaskets assembly bears the load from a bolted connection of the engine components and relies upon this load to provide adequate seal therebetween.

SUMMARY OF THE INVENTION

According to one aspect of the invention, an improved multi-layer gasket assembly is provided. The gasket assembly includes a plurality of metal gasket layers which have at least one set of axially aligned openings. The plurality of gasket layers includes at least two functional layers which are arranged in a stacked relationship with one another. Each functional layer has at least one full embossment bead that is spaced radially from and surrounds the at least one opening. The functional layers are also arranged such that the full embossment beads are in a nested relationship with one another. At least one stopper is positioned adjacent the nested full embossment beads for preventing full flattening of the full embossment beads.

The multi-layer gasket may be manufactured at a low cost and provides an exceptionally robust gas and fluid tight seal between a cylinder head and an engine block. Specifically, the nested full embossment beads drive an increased load against the cylinder head and the engine block during operation of the engine to maintain a fluid tight seal therebetween around the cylinder bores of the engine.

According to another aspect of the present invention, the plurality of functional layers is three functional layers with the full embossment beads being in the nested relationship.

According to yet another aspect of the present invention, the stopper is joined, such as through laser welding, with one of the functional layers.

According to still another aspect of the invention, the stopper is disposed radially between the aligned openings and the nested full embossment beads.

According to another aspect of the present invention, the plurality of stoppers are disposed radially on an opposite side of the nested full embossment beads from the aligned openings.

According to yet another aspect of the present invention, a distance layer is provided adjacent the stacked functional layers.

According to still another aspect of the invention, at least one protection layer is positioned on one axial side of the functional layers.

Another aspect of the present invention is related to a method of making a multi-layer gasket assembly. The method includes the step of preparing a plurality of metal functional layers with each functional layer having at least one opening and at least one full embossment bead which is spaced radially from and surrounds the at least one opening. The method proceeds with the step of stacking the functional layers with one another such that the openings of the functional layers are axially aligned with one another and such that the full embossment beads of the functional layers are in a nesting relationship with one another. The method continues with the step of locating at least one stopper adjacent the nested full embossment beads for preventing full flattening of the full embossment beads.

Still another aspect of the present invention is another method of making a multi-layer gasket assembly. The method includes the step of preparing a plurality of metal functional layers with each functional layer having at least one opening. The method continues with the step of stacking the functional layers with one another such that the openings of the functional layers are axially aligned with one another. The method proceeds the step of embossing the already stacked functional layers to provide the functional layers with full embossment beads that are nested with one another and surround the at least one opening. The method continues with the step of locating at least one stopper adjacent the nested full embossment beads for preventing full flattening of the full embossment beads.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 3 is a fragmentary and cross-sectional view of the multi-layer gasket of FIG. 1 as installed between an engine block and a cylinder head of an engine;

FIG. 4 is a fragmentary and cross-sectional view of a second exemplary embodiment of a multi-layer gasket assembly constructed according to at least one aspect of the present invention;

FIG. 9 is a fragmentary and cross-sectional view of a seventh exemplary embodiment of a multi-layer gasket assembly constructed according to at least one aspect of the present invention;

FIG. 10 is a fragmentary and cross-sectional view of an eighth exemplary embodiment of a multi-layer gasket assembly constructed according to at least one aspect of the present invention;

FIG. 11 is a fragmentary and cross-sectional view of a ninth exemplary embodiment of a multi-layer gasket assembly constructed according to at least one aspect of the present invention; and FIG. 12 is a fragmentary and cross-sectional view of a tenth exemplary embodiment of a multi-layer gasket assembly constructed according to at least one aspect of the present invention.

DESCRIPTION OF THE ENABLING EMBODIMENT

Figure 1:
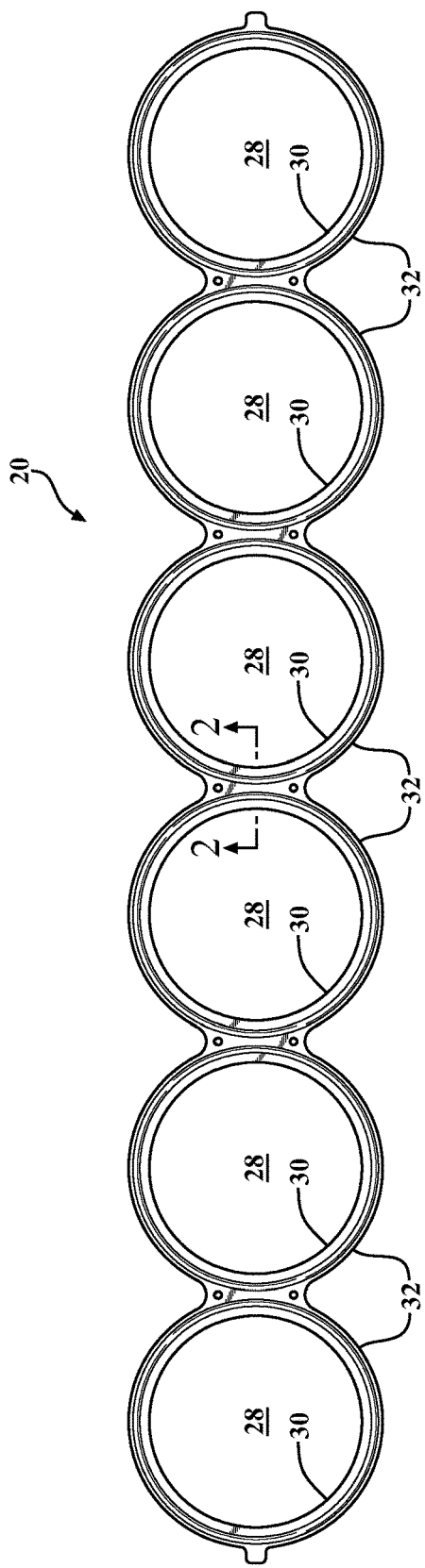
FIG. 1 is a top elevation view of a first exemplary embodiment of a multi-layer gasket assembly constructed according to at least one aspect of the present invention.
Figure 2:
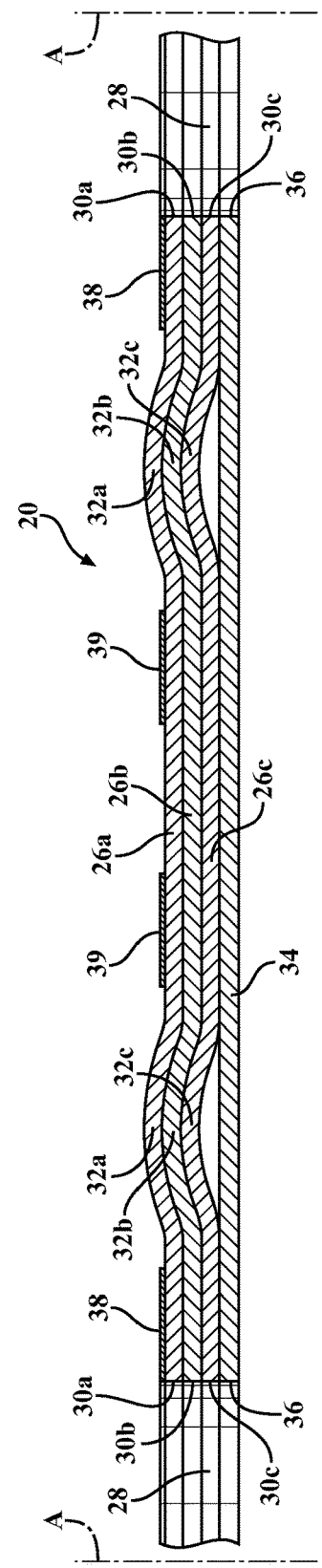
FIG. 2 is a fragmentary and cross-sectional view of the multi-layer gasket of FIG. 1 taken through Line 2-2 of FIG. 1.

Referring to the Figures, wherein like numerals indicate corresponding parts throughout the several views, a first exemplary embodiment of a multi-layer gasket assembly 20 for establishing a seal between a first member and a second member is generally shown in FIGS. 1-3. In the exemplary embodiment, the multi-layer gasket assembly 20 is a cylinder head gasket which is configured to establish gas and fluid tight seals around a plurality of cylinder bores and between an engine block 22 (shown in FIG. 3) and a cylinder head 24 (shown in FIG. 3) of a heavy-duty engine, such as for heavy duty equipment, and to maintain that seal during operation of the engine when the cylinder head 24 may lift off of the engine block 22 in response to a fuel and air combustion within the cylinder bores. However, it should be appreciated that the multi-layer gasket assembly 20 could find uses in a range of other vehicular or non-vehicular applications.

The first exemplary embodiment of the multi-layer gasket 20 includes three (or up to five) separately formed functional layers 26 which are hereinafter referred to as a top functional layer 26a, a middle functional layer 26b and a bottom functional layer 26c. The three functional layers 26 are overlayed on top of one another in a stacking relationship with the middle functional layer 26b being sandwiched between the top and bottom functional layers 26a, 26c. Each functional layer 26 has a plurality of openings 28 that extend around an axis A which is aligned with the cylinder bores of the engine block 22 and a plurality of inner peripheries 30 (identified as 30a for the top functional layer 26a, 30b for the middle functional layer 26b and 30c for the bottom functional layer 26c) which surround the openings 28. The functional layers 26 are preferably made of steel, stainless steel or an alloy steel. However, any suitable material may be employed.

Each of the functional layers 26 also has a generally flat portion and a plurality of full embossment beads 32 that extend axially from the flat portion. The full embossment beads 32 surround the openings 28 for establishing fluid tight seals between the engine block 22 and the cylinder head 24 around the cylinder bores. The full embossment beads 32 are spaced radially from the respective inner peripheries 30 of the functional layers 26. During operation of the engine, the full embossment beads 32 deform partially elastically to maintain a gas and fluid-tight seal around the cylinder bores of the engine as the cylinder head 24 lifts off the engine block 22 and falls back thereto.

The three stacked functional layers 26 are identical in shape and are oriented such that the full embossment beads 32 are in a nested relationship with one another. That is, the three embossment beads 32 all face in the same axial direction with the embossment bead 32b on the middle functional layer 26b being received within a groove defined by the embossment bead 32a of the top functional layer 26a and with the embossment bead 32c on the bottom functional layer 26c being received within a groove defined by the embossment bead 32b of the middle functional layer 26b. During operation, the nested embossment beads 32 have been found to drive an increased load against the cylinder head 24 and engine block 22 to provide for a stronger, more robust seal as compared to a single functional layer, even if that hypothetical single functional layer had a similar thickness to the combined thickness of the three functional layers 26 of the first exemplary embodiment. That is, the fluid-tight seal established by the nested full embossment beads 32 has been found to be greater than the sum of its parts.

The gasket assembly 20 of the first exemplary embodiment is also provided with a single protection layer 34 which is formed as a generally flat piece of material and is positioned such that an upper surface of the protection layer 34 contacts a bottom surface of the bottom functional layer 26c. As shown, the protection layer 34 is formed without any embossment beads, and the embossment beads 32 on the functional layers 26 extend axially away from the protection layer 34. Radially, the protection layer 34 extends from a plurality of inner peripheries 36 which are generally aligned with the inner peripheries 30 of the functional layers 26. As shown in FIG. 3, when installed in an engine, the protection layer 34 separates the bottom functional layer 26c from the engine block 22. The protection layer 34 may be made of the same material as the functional layers 26 or of a different material.

The exemplary gasket assembly 20 further includes a plurality of stoppers 38, 39 which are generally annular in shape and surround the openings 28 for preventing full flattening of the full embossment beads 32 during operation of the engine. The stoppers 38, 39 are positioned such that they contact a top surface of the top functional layer 26a. The stoppers 38, 39 are generally annular in shape and have a thickness which is preferably in the range of 0.05 mm and 0.20 mm. In the first exemplary embodiment, two stoppers 38, 39 surround each of the openings 28 with each stopper 38, 39 being positioned adjacent one of the full embossment bead 32. Specifically, a first stopper 38 is positioned radially between the aligned inner peripheries 30 and the full embossment beads 32, and a second stopper 39 is positioned radially on an opposite side of the full embossment beads 32 from the inner peripheries 30. The stoppers 38, 39 are preferably made of steel, stainless steel or an alloy steel. However, any suitable material may be employed. The stoppers 38, 39 are preferably connected with the top functional layer 26a via laser welding.

A second exemplary embodiment of the multi-layer gasket assembly 120 is generally shown in FIG. 4 with like numerals, separated by a factor of 100, indicating corresponding parts with the first exemplary embodiment. The second embodiment is similar to the first exemplary embodiment discussed above but is distinguished therefrom in that it lacks a protection layer. Accordingly, when installed in an engine, the bottom functional layer 126c directly contacts the engine block 22 (shown in FIG. 3).

Figure 5:
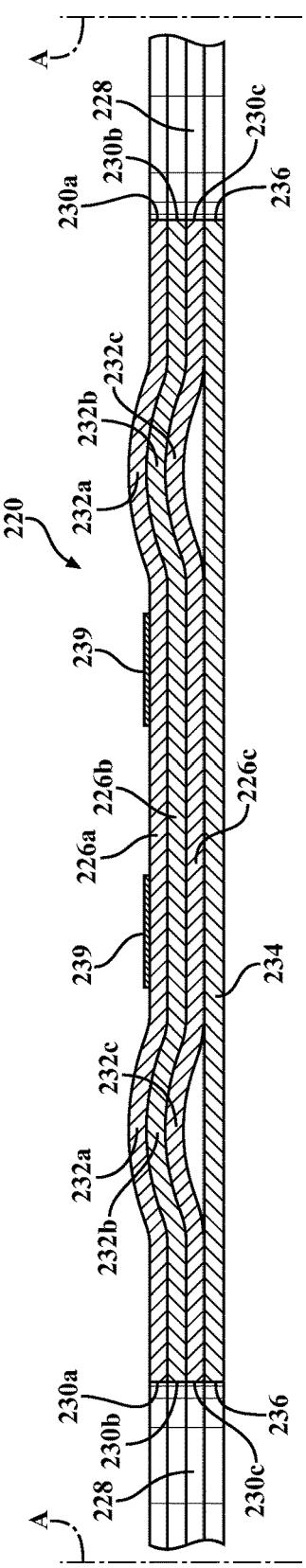
FIG. 5 is a fragmentary and cross-sectional view of a third exemplary embodiment of a multi-layer gasket assembly constructed according to at least one aspect of the present invention.

A third exemplary embodiment of the multi-layer gasket assembly 220 is generally shown in FIG. 5 with like numerals, separated by a factor of 200, indicating corresponding parts with the above-discussed embodiments. The third exemplary embodiment is distinguished from the first exemplary embodiment in that only a single stopper 239 is provided around each of the openings 228, and that single stopper 239 is located on an opposite radial side of the nested full embossment beads 232 from the aligned inner peripheries 230.

Figure 6:
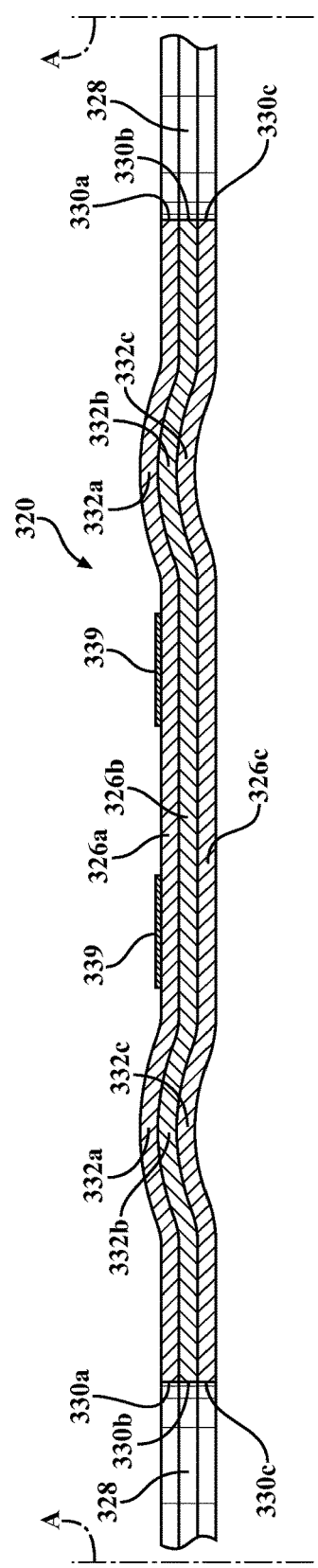
FIG. 6 is a fragmentary and cross-sectional view of a fourth exemplary embodiment of a multi-layer gasket assembly constructed according to at least one aspect of the present invention.

A fourth exemplary embodiment of the multi-layer gasket assembly 320 is generally shown in FIG. 6 with like numerals, separated by a factor of 300, indicating corresponding parts with the above-discussed embodiments. The fourth embodiment is distinguished from the first embodiment in that it lacks a protection layer and in that only a single stopper 339 is provided around each of the openings 328, and that single stopper 339 is located on an opposite radial side of the nested full embossment beads 332 from the aligned inner peripheries 330.

Figure 7:
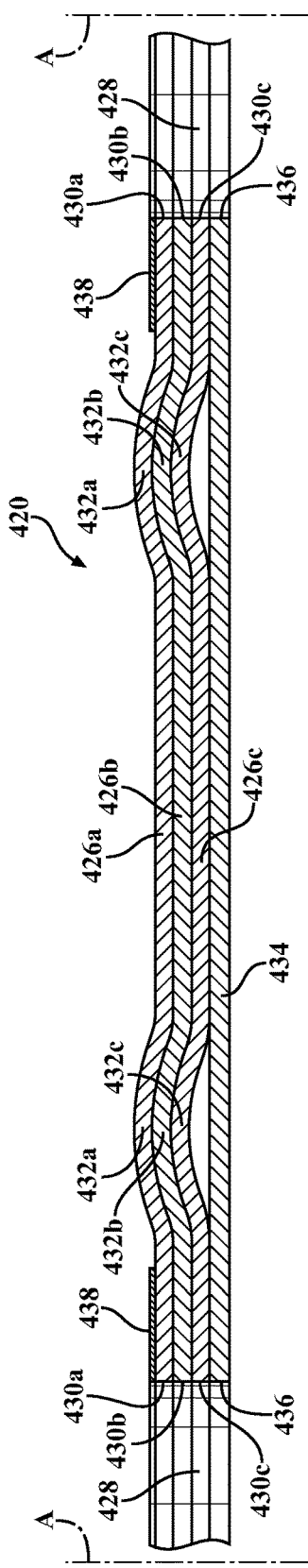
FIG. 7 is a fragmentary and cross-sectional view of a fifth exemplary embodiment of a multi-layer gasket assembly constructed according to at least one aspect of the present invention.

A fifth exemplary embodiment of the multi-layer gasket assembly 420 is generally shown in FIG. 7 with like numerals, separated by a factor of 400, indicating corresponding parts with the above-discussed embodiments. The fourth embodiment is distinguished from the first embodiment in that only a single stopper 438 is provided around each of the openings 428, and that single stopper 438 is located between the nested full embossment beads 432 and the aligned inner peripheries 430.

Figure 8:
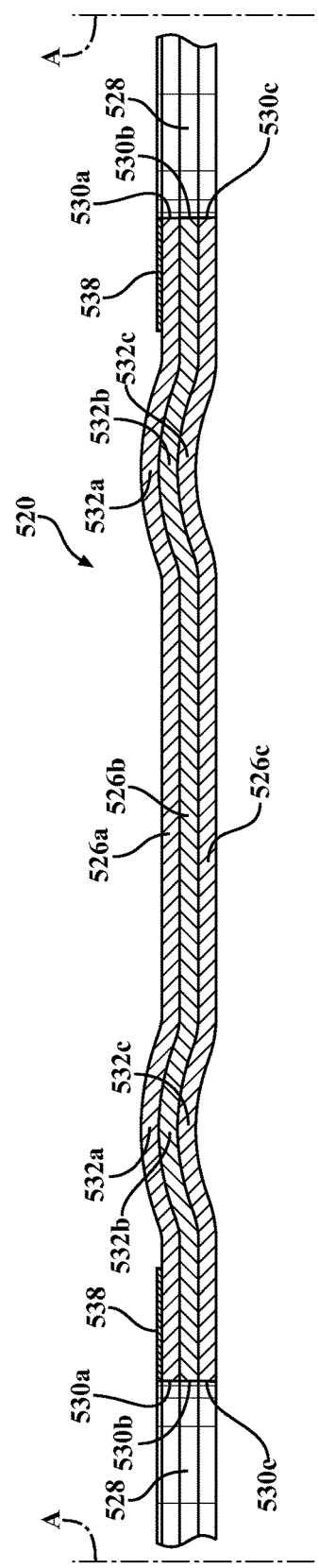
FIG. 8 is a fragmentary and cross-sectional view of a sixth exemplary embodiment of a multi-layer gasket assembly constructed according to at least one aspect of the present invention.

A sixth exemplary embodiment of the multi-layer gasket assembly 520 is generally shown in FIG. 8 with like numerals, separated by a factor of 500, indicating corresponding parts with the above-discussed embodiments. The sixth embodiment is distinguished from the first embodiment in that it lacks a protection layer and in that only a single stopper 538 is provided around each of the openings 528, and that single stopper 538 is located radially between the nested full embossment beads 532 and the aligned inner peripheries 530.

A seventh exemplary embodiment of the multi-layer gasket assembly 620 is generally shown in FIG. 9 with like numerals, separated by a factor of 600, indicating corresponding parts with the above-discussed embodiments. The seventh embodiment includes a distance layer 640 which is positioned radially between adjacent sets of functional layers 626, and the functional layers 626 and distance layer 640 are sandwiched between bottom and top protection layers 634, 635 with inner peripheries 636, 637. The distance layer 640 has a thickness which is greater than the combined thickness of the three functional layers 626 but is less than the combined height of the three functional layers 626 including the nested full embossment beads 632. This allows the distance layer 640 to assist in restricting full flattening of the nested full embossment beads 632 during operation of the engine. As with the first and second embodiments described above, the seventh embodiment includes a pair of stoppers 638, 639 surrounding each opening 628. One of the stoppers 638 is located radially between the full embossment beads 632 and the inner peripheries 630, and the other stopper 639 is located on an opposite radial side of the embossment beads 632 from the opening 628. Both of the stoppers 638, 639 are joined directly with the top functional layer 626a. The distance layer 640 may be made of the same material as the functional layers 626 or any suitable material.

An eighth exemplary embodiment of the multi-layer gasket assembly 720 is generally shown in FIG. 10 with like numerals, separated by a factor of 700, indicating corresponding parts with the above-discussed embodiments. The eighth embodiment is similar to the seventh embodiment described above but is distinguished therefrom by the stoppers 739 being welded to the distance layer 740 as opposed to the top functional layer 726a. As such, only a single stopper 739 surrounds each of the openings 728, and each stopper 739 is radially located on an opposite side of the full embossment beads 732 from the associated opening 728.

A ninth exemplary embodiment of the multi-layer gasket assembly 820 is generally shown in FIG. 11 with like numerals, separated by a factor of 800, indicating corresponding parts with the above-discussed embodiments. The ninth embodiment is distinguished from the seventh embodiment described above in that only a single stopper 838 surrounds each of the openings 828, and that single stopper 838 is located radially between the full embossment beads 832 and the inner peripheries 830.

A tenth exemplary embodiment of the multi-layer gasket assembly 920 is generally shown in FIG. 12 with like numerals, separated by a factor of 900, indicating corresponding parts with the above-discussed embodiments. The tenth embodiment is distinguished from the ninth embodiment discussed above in that each stopper 938 is located on an opposite radial side of the full embossment beads 932 from the associated opening 928.

Referring back to FIGS. 1-3, another aspect of the present invention is related to a method of making a multi-layer gasket assembly 20. The method includes the step of preparing a plurality of metal functional layers 26, each functional layer 26 having at least one opening 28 and a full embossment bead 32 which is spaced radially from and surrounds the at least one opening 28. The plurality of metal functional layers 26 may be, for example, three functional layers 26. The method proceeds with the step of stacking the functional layers 26 with one another such that the openings 28 of the functional layers 26 are axially aligned with one another and such that the full embossment beads 32 of the functional layers 26 are in a nesting relationship with one another. Alternately, the full embossment beads 32 could be formed into the functional layers 26 after the functional layers 26 are already stacked on top of one another. Likewise, the openings 28 may be formed into the functional layers 26 before or after the stacking of the functional layers 26. The method continues with the step of locating at least one stopper 38, 39 adjacent the nested full embossment beads 32 for preventing full flattening of the full embossment beads 32. The stopper 38, 39 is preferably welded, such as through laser welding, to one of the functional layers 26. The at least one stopper 38, 39 may include two stoppers 38, 39 with one stopper 38 being located radially between the full embossment beads 32 and the opening 28 and the other stopper 39 being located on an opposite radial side of the full embossment beads 32 from the opening 28.

As shown in FIG. 9, the method may further include the step of locating a distance layer 640 on an opposite radial side of the functional layers 626 from the at least one opening 628. First and second protection layers 634, 635 may then be provided on opposite axial sides of the distance layer and the stacked functional layers 626.

Obviously, many modifications and variations of the present invention are possible in light of the above teachings and may be practiced otherwise than as specifically described while within the scope of the appended claims.

What is claimed is:
1. A multi-layer gasket assembly, comprising:
a plurality of metal gasket layers including three to five functional layers, said at least two functional layers having at least two sets of axially aligned openings, and said at least two functional layers further having a set of full embossment beads spaced radially from and surrounding each of said at least two sets of axially aligned openings;

said at least two functional layers being in a stacked relationship with one another, and for each of said sets of full embossment beads, said full embossment beads of all of said functional layers in said multi-layer gasket assembly being in a nested relationship with one another;

a pair of annularly-shaped stoppers positioned adjacent said nested full embossment beads and fully encircling each of said at least two sets of axially aligned openings for preventing full flattening of said full embossment beads; and one of said stoppers being disposed radially between said nested embossment beads and said aligned openings and the other of said stoppers being disposed radially on an opposite side of said nested full embossment beads from said aligned openings.

2. The multi-layer gasket assembly as set forth in claim 1 wherein said stopper is joined with one of said functional layers.

3. The multi-layer gasket assembly as set forth in claim 2 wherein said stopper is joined with one of said functional layers with a laser welding weld joint.

4. The multi-layer gasket assembly as set forth in claim 1 wherein said stopper is disposed radially between said aligned openings and said nested full embossment beads.

5. The multi-layer gasket assembly as set forth in claim 1 wherein said stopper is disposed radially on an opposite side of said nested full embossment beads from said aligned openings.

6. A method of making a multi-layer gasket assembly, comprising the steps of:
   preparing a three to five metal functional layers;
   forming at least two openings into each of the functional layers;
   forming at least one full embossment bead into each of the functional layers such that, in each functional layer, the at least one full embossment bead is spaced radially from and surrounds one of the at least two openings;
   stacking the functional layers with one another such that the openings of the functional layers are axially aligned with one another and such that the full embossment beads of all of said functional layers are in a nesting relationship with one another; and
   locating a pair of annularly-shaped stoppers adjacent the nested full embossment beads and fully encircling each of said at least two sets of axially aligned openings for preventing full flattening of the full embossment beads and wherein one of the stoppers is disposed radially between the nested full embossment beads and the aligned openings and the other of the stoppers is disposed radially on an opposite side of the nested full embossment beads from the aligned openings.

7. The method of making a multi-layer gasket assembly as set forth in claim 6 wherein said step of locating a pair of stoppers is further defined as laser welding the stoppers with one of the functional layers.

8. A multi-layer gasket assembly, comprising:
   a plurality of metal gasket layers including at least two functional layers, said at least two functional layers having at least two sets of axially aligned openings, and said at least two functional layers further having a set of full embossment beads spaced radially from and surrounding each of said at least two sets of axially aligned openings;
   said at least two functional layers being in a stacked relationship with one another, and for each of said sets of full embossment beads, said full embossment beads of all of said functional layers in said multi-layer gasket assembly being in a nested relationship with one another;
   at least one annularly-shaped stopper positioned adjacent said nested full embossment beads and fully encircling each of said at least two sets of axially aligned openings for preventing full flattening of said full embossment beads; and
   wherein said plurality of metal gasket layers further includes a protection layer abutting one of said functional layers and wherein said nested full embossment beads extend axially away from said protection layer.

* * * * *